2,891,988

5-FORMYL-2-OXOVALERIC ACID, ITS SALTS AND ESTERS AND A PROCESS OF PRODUCING THE SAME

John A. Brockman, Jr., Woodcliff Lake, N.J., and Paul Frank Fabio, Pearl River, N.Y., assignors to American Cyanamid Company, New York, N.Y., a corporation of Maine No Drawing. Application August 19, 1957
Serial No. 679,057

5 Claims. (Cl. 260—483)

This invention relates to 5-formyl-2-oxovaleric acid and its salts and esters, and to a process of preparing these new products. The invention also includes a new ozonide which serves as an intermediate for the new products of the present invention and a process of preparing it.

Recently it has been discovered by Broquist and Brockman, copending application Serial No. 679,058 filed August 19, 1957, for an improvement in Production of Lysine, that 5-formyl-2-oxovaleric acid can be converted by the enzymes of yeast to l-lysine, one of the essential amino acids.

The example in said application reads as follows:

A synthetic medium was prepared with the following components:

TABLE I

| Ingredient | Synthetic Medium—Grams/Liter Final Strength Medium |
| --- | --- |
| Dextrose | 50 |
| KH$_2$PO$_4$ | 0.3 |
| MgSO$_4$ | 0.1 |
| Aspartic Acid | 0.2 |
| Glutamic Acid | 0.2 |
| (NH$_4$)$_2$SO$_4$ | 3.8 |
| Sodium Citrate Buffer [1] | 50 ml. |
| Vitamin Solution [2] | 10 ml. |
| Water to 1 liter. | |

[1] Sodium citrate buffer:
  100 grams sodium citrate.
  20 grams citric acid.
  water to 1 liter.

[2] Vitamin solution:
  Thiamine ----------------------------------- mg-- 20.0
  Biotin ------------------------------------- mg-- 0.2
  Pyridoxine --------------------------------- mg-- 20.0
  Calcium pantothenate ----------------------- mg-- 20.0
  Inositol ----------------------------------- mg-- 200.0
  Nicotinic acid ----------------------------- mg-- 20.0
  Water to 40 ml.

Portions of the above-described synthetic medium were placed in fermentation vessels and sterilized. To some of these was added aseptically varying amounts of 5-formyl-2-oxovaleric acid as indicated in the table below. Others served as controls. The fermentation vessels were inoculated with 24- to 28-hour cultures of growing yeast cells. Strains Y–80 and Y–416 in the table were *Saccharomyces cereviseae*. Strains Y–3 and Y–4 were unidentified species of Saccharomyces. The fermentation vessels were then incubated for 72 hours at about 24° C. on a reciprocal shaker. At the end of the fermentation period, the contents of the vessels were steamed for ten minutes to rupture the yeast cells and liberate the free l-lysine contained therein. The fermented liquor was centrifuged and the supernatant liquor was analyzed for its l-lysine content by a microbiological method described by Steel et al. in the Journal of Biological Chemistry, 177, page 533 (1949). The results of this series of fermentations are shown in the table below.

TABLE II

| KAAL, γ/Ml. | Yeast Strain | | | |
| --- | --- | --- | --- | --- |
| | Y–80 | Y–3 l-Lysine | Y–4/Ml. | Y–416 |
| None | 42 | 3 | 6 | 6 |
| 125 | | 3 | 3 | 6 |
| 150 | 68 | | | |
| 250 | | 29 | 22 | 62 |
| 500 | 190 | 40 | 34 | 80 |
| 1,500 | 136 | | | |

Note.—KAAL is used as an abbreviation for ketoadipic aldehyde in place of the longer 5-formyl-2-oxovaleric acid.

Lysine is deficient in many cereal grains and is being added to food products made from these grains to bring their amino acid content into a more effective nutritional balance. Although lysine can be made by synthetic chemical methods and also by fermentation processes, it is a very expensive material. Accordingly, other methods of producing lysine are desirable. The production of 5-formyl-2-oxovaleric acid provides a new intermediate through which lysine can be produced by the new process of Broquist and Brockman.

5-formyl-2-oxovaleric acid is prepared by the process of the present invention with the known compound ethyl cyclopentene-1-carboxylate as starting material. Other esters of cyclopentene-1-carboxylic acid may be used in place of the ethyl ester which is, however, preferred. The first step of our new process involves ozonization of the starting ester of the cyclopentene-1-carboxylic acid. This ozone which is a new compound may then be reductively decomposed to yield an ester of 5-formyl-2-oxovaleric acid. Simple hydrolysis of the ester yields the 5-formyl-2-oxovaleric acid.

The ozonization of the 1-carbalkoxycyclopentene is readily ecected by contacting the pentene with ozone. It is usually more convenient to dissolve or suspend the pentene in an organic liquid not readily attacked by the ozone. Water, unsaturated hydrocarbons, sulfides and mercaptans are considered undesirable solvents. The lower alcohols, though attacked by ozone to some extent, may be used because their rate of decomposition is not rapid and the ozonization may be completed before the solvent is seriously decomposed.

The reaction is carried out by simply passing a stream of ozone through the solution, or suspension, of the 1-carbalkoxycyclopentene until the reaction is complete, as is evidenced by absorption of an equimolar amount of ozone or by the blue color of the solution resulting from an excess of ozone. A variety of ozone generators are available, and any suitable source of ozone is satisfactory.

An advantage of the invention is that the 1-carbalkoxycyclopentene ozonide need not be recovered from the reaction mixture. It is readily reduced to the 5-formyl-2-oxovaleric acid ester even by simple heating with water. Although this is a cheap means of reducing the ozonide, it is not generally desirable because there is a tendency for hydrogen peroxide to form which oxidizes some of the desired product to glutaric acid resulting in a lower yield. Formation of the by-product glutaric acid can be minimized if the ozonide is decomposed in the presence of an excess of an easily oxidizable material such as formaldehyde.

Various other reducing agents may be used to decompose the ozonide to the desired product. Hydrogen with palladium on charcoal as the reduction catalyst may be used at room temperature and at approximately 1 atmosphere absolute pressure.

The product of the reductive decomposition, 5-formyl-2-oxovaleric acid ester may be recovered by simply filtering off the catalyst and evaporating the solvent. Simple saponification with alkali or hydrolysis with acid yields the 5-formyl-2-oxovaleric acid, as will be shown in the following examples.

*Example I*

Ethyl cyclopentene-1-carboxylate was prepared by the method of Cook and Linstead, Journal of the Chemical Society, 959 (1934). A 31.7 gram sample of this ester was dissolved in 150 milliliters of glacial acetic acid containing 4.13 milliliters of acetic anhydride. A stream of ozonized oxygen from a Welsbach T-23 generator, delivering about 3 to 4 milli-equivalents of ozone per minute at a flow rate of 1.1 liters per minute was passed through the solution, cooled, to 10–20° C. Analysis of the exit gas showed that ozone was being absorbed essentially quantitatively. When analysis showed that ozone was breaking through at approximately its delivery rate, the flow of ozonized oxygen was discontinued and nitrogen gas was passed through the solution for a short time.

To the ozonized solution was added 22.1 grams of formalin (37 percent formaldehyde). When this was heated on the steam bath, an exothermic reaction took place, and the temperature rose to 108° at which time cooling was applied to prevent further increase in temperature. After about 15 minutes, the vigorous reaction accompanied by effervescence subsided. Heating was continued for an hour at which time, starch-iodide paper still showed the presence of considerable peroxide. Additional formalin (0.82 gram) was added and heating was continued for ten minutes, at which time the peroxide test was essentially negative.

Solvent was removed under vacuum and the residual oil (38.5 grams) was distilled at 0.28 to 0.75 millimeter pressure. Two main fractions were collected, 80–120° (20.9 grams), and 120–183° (12.0 grams).

Repeated distillations of the lower boiling material gave rise to a liquid boiling at 80–81° C. at 0.21 millimeter, having $n_D^{20}$ 1.4462 and $d_{20}$ 1.162, whose analysis (carbon, 55.07; hydrogen, 7.43; O-ethyl, 25.82. Calculated for $C_8H_{12}O_4$: carbon, 55.80; hydrogen, 7.03, O-ethyl, 26.17) showed it to be primarily ethyl 5-formyl-2-oxovalerate. This material gave a bis-2,4-dinitrophenylhydrazone, melting point 172–173° C. Calculated for $C_{20}H_{20}O_{10}N_8$: carbon, 45.11; hydrogen, 3.79; nitrogen, 21.05. Found: Carbon, 45.06; hydrogen, 3.91; nitrogen, 20.85. It also gave a di-semicarbazone, melting point 192–193° C. Calculated for $C_{10}H_{18}O_4N_6$: carbon, 41.95; hydrogen, 6.34; nitrogen 29.36. Found: Carbon, 41.98; hydrogen, 6.85; nitrogen, 29.11. The dioxime was an oil which could be distilled at about 160–180° C. at 0.13 to 0.20 millimeter.

The high boiling fractions from the above distillation solidified, and the product was crystallized from ether-ligroin mixture to give 5-carbethoxy-5-oxovaleric acid, melting point 54–55.5° C. Calculated for $C_8H_{12}O_5$: carbon, 51.06; hydrogen, 6.43. Found: Carbon, 50.79; hydrogen, 6.48. This ester is radily saponified to 2-oxoadipic acid.

Although the principal product of this example was ethyl 5-formyl-2-oxovalerate, a small amount of 5-carbethoxy-5-oxovaleric acid was obtained which was readily saponified to 2-oxoadipic acid, another precursor of l-lysine by yeast cells. Although careful control of the reductive decomposition can lead to larger amounts of either 5-formyl-2-oxovaleric acid ester or 5-carbalkoxy-5-oxovaleric acid, an advantage of the process is that it is not necessary to separate these two products if they are intended to be used as precursors for the production of l-lysine. Since these two esters are both readily saponified to the free acid, the crude reaction product may be so treated and the resulting crude mixture of 5-formyl-2-oxovaleric acid and 2-oxoadipic acid may be subjected to the action of the yeast cells whereby lysine is produced.

*Example II*

Saponification of ethyl 5-formyl-2-oxovalerate takes place rapidly in aqueous or alcoholic media. Thus, 1 gram of ethyl 5-formyl-2-oxovalerate was suspended in 5 milliliters of water and 1 N sodium hydroxide was added until the pH remained between 7.5 and 8.0 for 15 minutes. A small amount of impurity present as an insoluble oil was extracted with ether. The sodium salt of 5-formyl-2-oxovaleric acid is obtained by carefully evaporating the resulting aqueous solution to dryness. Other salts are obtained by saponification with other bases such as potassium hydroxide, calcium hydroxide, barium hydroxide, and the like.

*Example III*

A 10.6-gram sample of ethyl 5-formyl-2-oxovalerate was saponified as described above. The aqueous solution was then made acidic with hydrochloric acid and extracted with ether and ethyl acetate. Evaporation of the solvent left the 5-formyl-2-oxovaleric acid as a colorless oil, which could not be distilled without serious decomposition.

An alternate way to isolate the free acid consists in adding to the saponification mixture an amount of hydrochloric acid exactly equivalent to the alkali, evaporating the mixture to dryness, and extracting the residue with an organic solvent such as ether or ethyl acetate.

*Example IV*

Ethyl cyclopentene-1-carboxylate (14.0 grams) was ozonized in 150 milliliters of acetic acid and 4.13 milliliters of acetic anhydride as described above. To the ozonized solution was added 3.6 milliliters of water, and the mixture was heated to 95° C. for 30 minutes. Then a second 3.6-milliliter portion of water was added and heating was continued for 30 minutes. Then 7.5 milliliters of formic acid was added and heating was continued for 18 hours. At this time, a test for peroxide was negative. Solvent was removed at the water pump to leave a residue of 15.6 grams. Distillation in vacuo and crystallization yielded ethyl-5-formyl-2-oxovalerate, and smaller amounts of 5-carbethoxy-5-oxovaleric acid, glutaric acid, and 2-oxoadipic acid.

We claim:
1. A lower alkyl ester of 5-formyl-2-oxovaleric acid.
2. Ethyl 5-formyl-2-oxovalerate.
3. 5-formyl-2-oxovaleric acid.
4. An alkali forming metal salt of 5-formyl-2-oxovaleric acid.
5. Sodium 5-formyl-2-oxovalerate.

References Cited in the file of this patent

Kon et al.: J. Chem. Soc. (London), 1933, 1632–3.
Henne et al.: J. Am. Chem. Soc. 65, 2185 (1943)
Clauson-Kaas et al.: Chem. Abs. 47, 7480c (1953).
Houben-Weyl: "Methoden der Organischen Chemie, vol. VII, part I, Oxygen Compounds II, 1954, pp. 336 and 345.